United States Patent [19]

Hashimoto et al.

[11] Patent Number: 5,242,871
[45] Date of Patent: Sep. 7, 1993

[54] HEAT-RESISTANT EXPANSION MEMBER

[75] Inventors: Akira Hashimoto; Susumu Hoshi, both of Sanda, Japan

[73] Assignee: Nippon Pillar Packing Co., Ltd., Osaka, Japan

[21] Appl. No.: 860,586

[22] Filed: Mar. 30, 1992

Related U.S. Application Data

[63] Continuation of Ser. No. 692,790, Apr. 29, 1991, abandoned, which is a continuation of Ser. No. 313,548, Feb. 22, 1989, abandoned.

[30] Foreign Application Priority Data

Feb. 29, 1988 [JP] Japan .................. 63-47979
Jul. 8, 1988 [JP] Japan .................. 63-171336

[51] Int. Cl.$^5$ .............................................. C04B 35/02
[52] U.S. Cl. ........................................ 501/95; 501/128; 428/327; 428/454; 428/913; 428/331; 252/378 R
[58] Field of Search ............. 501/95, 128; 252/378 R; 428/454, 913, 327, 331

[56] References Cited

U.S. PATENT DOCUMENTS 3,916,057 10/1975 Hatch et al. .................. 106/DIG. 3
4,305,992 12/1981 Langer et al. ................. 106/DIG. 3
4,746,570 5/1988 Suzaki et al. .................. 106/DIG. 3

OTHER PUBLICATIONS

Chem Abstracts Japanese Laid Open Patent—(Abstract) #58-208164 "Heat Resistant and Elastic Sheet—from Alpha Sepiolite, Unexpanded Vermiculite, Binder, and Ceramic Fiber has Improved Flexibility and Resilience".

Primary Examiner—Mark L. Bell
Assistant Examiner—Paul Marcantone
Attorney, Agent, or Firm—Jones, Tullar & Cooper

[57] ABSTRACT

The heat resistant expansion member used as the holding member of the ceramic honeycomb monolithic catalyst in an automobile comprises 20 to 40 wt. % of sepiolite, 30 to 54 wt. % of particulate vermiculite, 20 to 40 wt. % of ceramic fibers, and 5 to 20 wt. % of organic bonding material, or 20 to 40 wt. % of sepiolite, 30 to 54 wt. % of treated vermiculite, 20 to 40 wt. % of ceramic fibers, 5 to 20 wt. % of organic bonding material, and 1 to 10 wt. % of E-glass with fiber diameter of 1 μm or less, so that a large holding force is maintained whether in a low temperature region or in a high temperature region.

8 Claims, 2 Drawing Sheets

HEAT-RESISTANT EXPANSION MEMBER

This is a continuation of co-pending application Ser. No. 07/692,790, abandoned, filed on Apr. 29, 1991, which is a continuation of application Ser. No. 07/313,548, filed Feb. 22, 1989, abandoned.

BACKGROUND OF THE INVENTION

This invention relates to a heat resistant expansion member in, for example, a sheet form preferable as a holding member of a ceramic honeycomb monolithic catalyst comprising a catalyst converter in a low pollution engine capable of purifying the emission by oxidizing or reducing the harmful components discharged from an automotive engine such as carbon monoxide, hydrocarbon and nitrogen oxides.

As the catalyst for achieving a low pollution engine by purifying the emission by oxidizing or reducing the harmful components discharged from an automotive engine such as carbon monoxide, hydrocarbon and nitrogen oxides, the ceramic honeycomb monolithic catalyst excellent in high temperature characteristics is preferred.

Since the ceramics are brittle and inferior in toughness, they are installed in a metallic casing being protected with a winding of cushioning holding members so as not to be damaged by the mechanical impacts such as vibrations occurring while the vehicle is running.

The ceramic honeycomb monolithic catalyst is exposed to high temperature emission of the engine, and the holding member is required to have an excellent heat resistance so as not to be lowered in the high temperature strength. What is more, since the emission is gradually heightened in temperature as the engine runs continuously, the holding member is thermally expanded depending on the temperature increase, and even in such circumstances it is required that the holding power and cushioning property for the ceramic honeycomb monolithic catalyst may not be lowered.

As an example of a holding member of the monolithic catalyst capable of satisfying such requirements, the heat resistant expansion sheet disclosed in the Japanese Laid-open Patent 56-92155 (1) and the heat resistant expansion sheet disclosed in the Japanese Laid-open Patent 58-208164 (2) are known.

The heat resistant expansion sheet (1) is composed of 40 to 65 wt. % of treated vermiculite, 25 to 50 wt. % of ceramic fibers, 5 to 15 wt. % of organic elastomer latex polymer and inorganic bonding material, and the heat resistant expansion sheet (2) is composed of 5 to 20 wt. % of sepiolite, 5 to 22 wt. % of treated vermiculite, 5 to 15 wt % of organic bonding material such as ester acrylate.

In these heat resistant expansion sheets (1) and (2), however, as clear from Table 1 herein the basis of the experimental results achieved by the present inventor, a relatively large negative expansion occurs due to creep phenomenon around 300° C. corresponding to the low temperature region, thereby resulting in looseness, which is known to extremely lower the holding power of the ceramic honeycomb monolithic catalyst.

Accordingly, in order to increase the holding power of the ceramic honeycomb monolithic catalyst, an experiment was conducted by increasing the tightening surface pressure from the value in Table 1. As a result, as shown in Table 2, in spite of a relatively large negative expansion, the same as in Table 1, occurring around 300° C. corresponding to the low temperature region, the thermal expansion was inhibited around 750° C. corresponding to the high temperature region owing to the large setting of the tightening surface pressure, and the coefficient of thermal expansion was notably smaller than in Table 1, and it was found that the holding power of the ceramic honeycomb monolithic catalyst in the high temperature region was extremely lowered. At the same time, as clear from Table 3, it is known that the drop of the residual holding force is significant when loaded repeatedly with vibration.

SUMMARY OF THE INVENTION

In light of the above background, the present invention provides a heat resistant expansion member which maintains a large holding force, whether in the low temperature region or in the high temperature region, and prevents looseness due to mechanical impact such as vibration occurring during traveling of the vehicle, thereby preventing damage of the ceramic honeycomb monolithic catalyst.

In order to achieve the above object, a first aspect of the present invention prescribes, as the blending ratio, 20 to 40 wt. % of sepiolite, 30 to 60 wt. % of particulate vermiculite, 20 to 40 wt. % of ceramic fibers, and 5 to 20 wt. % of organic bonding material.

Also in order to achieve the above object, a second aspect of the present invention prescribes 20 to 40 wt. % of sepiolite, 30 to 54 wt. % of treated vermiculite, 20 to 40 wt. % of ceramic fibers, 5 to 20 wt. % of organic bonding material, and 1 to 10 wt. % of E-glass fibers with fiber diameter of 1 $\mu$m or less.

According to the first aspect of the present invention, since sepiolite is contained at a ratio of 20 to 40 wt. %, the negative expansion in the low temperature region around 300° C. can be extremely reduced, and a large holding force may be maintained, while the heat resistance and the coefficient of thermal expansion in the temperature region of 400° to 800° C. are increased, and a large holding force is also maintained in the high temperature region.

Besides, since particulate vermiculite is contained by 30 to 54 wt. %, the cushioning property for effectively alleviating the mechanical impact such as vibration, and the heat resistance for maintaining the holding force may be enhanced.

Still further, since ceramic fibers are contained by 20 to 40 wt. % the heat resistance in the high temperature region is improved, and negative expansion in the low temperature region is prevented, and in particular they exhibit the function of bonding in the high temperature region where the organic bonding material is completely lost, thereby improving the holding properties.

Furthermore, since organic bonding material is contained by 5 to 20 wt. %, the shape retaining ability at ordinary temperature is improved, and handling is hence enhanced.

According to the second invention, since sepiolite is contained at a ratio of 20 to 40 wt. %, the negative expansion in the low temperature region around 300° C. can be extremely reduced, and a large holding force may be maintained, while the heat resistance and the coefficient of thermal expansion in the temperature region of 400° to 800° C. are increased, and a large holding force is also maintained in the high temperature region.

Besides, since treated vermiculite is contained by 30 to 54 wt. %, the cushioning property for effectively alleviating the mechanical impact such as vibration, and the heat resistance for maintaining the holding force may be enhanced.

Still further, since ceramic fibers are contained by 20 to 40 wt. % the heat resistance in the high temperature region is improved, and negative expansion in the low temperature region is prevented, and in particular they exhibit the function of bonding in the high temperature region where the organic bonding material is completely lost, thereby improving the holding properties. Furthermore, since organic bonding material is contained by 5 to 20 wt. %, the shape retaining ability at ordinary temperature is improved, and handling is hence enhanced. In addition, since E-glass fibers with a fiber diameter of 1 μm are contained by 1 to 10 wt. %, the shape retaining ability at ordinary temperature and the strength at high temperature are further improved.

Thus, the first and second aspect of the present invention bring about useful actions and effects, and other features and effects thereof will be better understood and appreciated from the following detailed description taken in conjunction with the drawings.

DETAILED DESCRIPTION OF THE PREFERRED EMBODIMENTS

Figure 1:
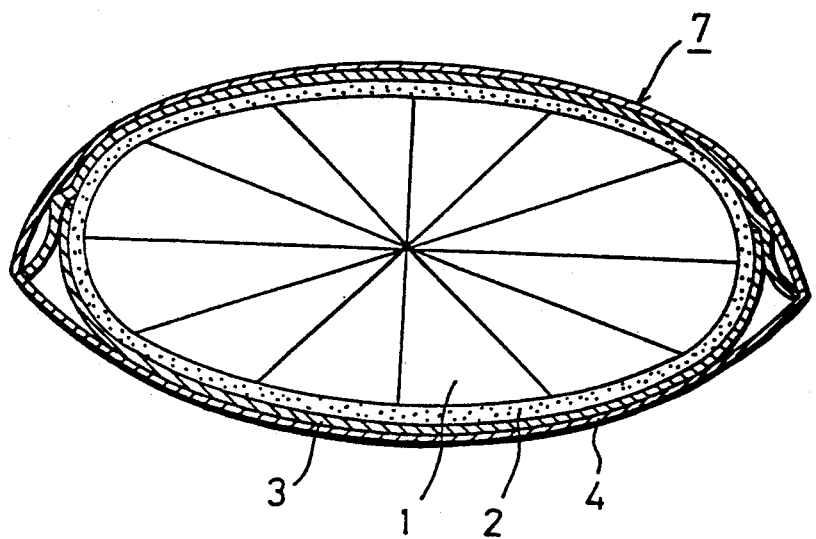
FIG. 1 is a schematic sectional view showing an example of a catalyst converter used in an automobile.

FIG. 1 is a schematic sectional view showing an example of a catalyst converter, in which numeral 1 is a ceramic honeycomb monolithic catalyst, and a heat resistant expansion sheet 2 is wound around its outer circumference, and the assembly is put into a two-half metallic casing 3, the outer circumference of which is tightened by a metallic band 4.

In the first aspect of the invention, the heat resistant expansion sheet 2 is manufactured by the beater saturation process at the blending ratio of 20 to 40 wt. % of sepiolite, 30 to 54 wt. % of particulate vermiculite, 20 to 40 wt. % of ceramic fibers, and 5 to 20 wt. % of organic bonding material. The two-half metallic casing 3 and the metallic band 4 are made of SUS304.

The sepiolite of the heat resistant expansion sheet 2 is available in two types depending on the degree of crystallization, a fibrous type with high degree of crystallinity is called alpha-sepiolite, while a powder type with low degree of crystallinity or amorphous state is known as beta-sepiolite. Since beta-sepiolite is a powder and is inferior in interlocking performance with ceramic fibers or vermiculite, alpha-sepiolite is used, or both alpha and beta types may be mixed. Sepiolite is solidified when kneaded in water and is dried. At 400° to 800° C., a light sintering property is obtained, and in particular alpha-sepiolite interlocks very well with ceramic fibers and vermiculite, and is not broken, unlike glass fibers and ceramic fibers, if rubbed or tightened. Accordingly, the heat resistant expansion sheet 2 containing sepiolite prevents negative expansion around 300°C. under surface pressure loading, and improves the holding force of the ceramic honeycomb monolithic catalyst 1. However, at less than 20 wt. %, a sufficient strength cannot be assured, or when exceeding 40 wt. %, the coefficient of thermal expansion is lowered.

The particulate vermiculite is, when heated, dehydrated and expanded by separation to 10 to 25 times of the original volume. The well-expanded vermiculite is abundant in elasticity and brings about a sufficient cushioning property. However, at less than 30 wt. %, the specified thermal expansion is not expected, and when exceeding 60 wt. %, it becomes too light, and the strength is lowered. Therefore, the blending ratio of particulate vermiculite should be properly 30 to 54 wt. %.

Ceramic fibers improve the heat resistance, and prevent negative expansion around 300° C., and also help to retain the shape by exhibiting the function of interlocking in the high temperature region where the organic bonding material is lost completely.

As the organic bonding material, acrylate polymer, cellulose pulp, etc. are useful, and the content should be controlled within 5 to 20 wt. % because the flexibility at ordinary temperature is insufficient at less than 5 wt. %.

EMBODIMENT 1

It was decided to manufacture a heat resistant expansion sheet with a thickness of 4.4 mm and a density of 0.5 to 0.8 g/cm$^3$ or preferably 0.7 g/cm$^3$ by the beater saturation process, using 20 wt. % of alpha-sepiolite, 40 wt. % of particulate vermiculite, 28 wt. % of ceramic fibers, 2 wt. % of pulp (NBKP) as organic bonding material, and 10 wt. % of ester acrylate.

The sepiolite used in this embodiment was Silcon MS 2-2 manufactured by Showa Mining Industry Co., particulate vermiculite was unsintered South African No. 1, ceramic fibers were SC Bulk manufactured by Nippon Steel Chemical Co., the pulp was NBKP, and ester acrylate was LX852 manufactured by Nippon Zeon Co.

Incidentally, hemp pulp may also be used, and instead of the ester acrylate, a synthetic rubber NBR1562 of Nippon Zeon may also be used.

Figure 2:
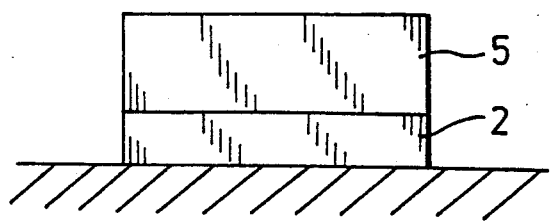
FIG. 2 is a schematic diagram showing a surface pressure loading method in the surface pressure loading test of heat resistant expansion members.

Using this heat resistant expansion sheet 2, a sample of 40 mmφ in diameter was prepared as shown in FIG. 2, and a weight 5 made of Hastelloy C of 40 mmφ was placed on this sample to apply a surface pressure, and the sample was put into an electric furnace in this state to be heated, and was then taken out and cooled, then the weight 5 was removed, and the thickness of the heat resistant expansion sheet 1 was measured by a dial gage. The result is shown as A in Tables 1 and 2. In the same condition, the result of heat resistant expansion sheet of prior art (1) is shown as B in Tables 1 and 2, and that of the heat resistant expansion sheet of prior art (2) is given as C in Tables 1 and 2.

TABLE 1

| Coefficient of expansion when loaded with tightening surface pressure of 0.08 kgf/cm$^2$ (%) | | | |
|---|---|---|---|
| | A | B | C |
| 300° C. × 1 hour heating | −2 | −7 | −7 |
| 750° C. × 15 hour heating | 97 | 110 | 100 |

TABLE 2

| | Coefficient of expansion when loaded with tightening surface pressure of 0.36 kgf/cm² (%) | | |
|---|---|---|---|
| | A | B | C |
| 300° C. × 1 hour heating | −2 | −7 | −7 |
| 750° C. × 70 hour heating | 78 | 53 | 58 |

In Tables 1 and 2, the heat resistant expansion sheet 1 of the present invention indicated by A is smaller in the negative expansion at 300° C. (low temperature region) as compared with the heat resistant expansion sheets of the prior art (1) and (2) indicated by B and C, and it is also known that a significant drop of the coefficient of expansion as recorded by B and C is not shown even when the tightening surface pressure is high at 750° C. (high temperature region).

In the catalyst converter structured as shown in FIG. 1, only the heat resistant expansion sheet was replaced with the product of the present invention and the sheets of the prior art (1) and (2), and heating was conducted in an electric furnace in the condition of 780° C.×15 min., and oscillation was applied for 2 hours, and then the holding force of the ceramic honeycomb monolithic catalyst was measured. The results are indicated as A, B, C in Table 3.

The heat resistant expansion sheet was set to a size of 100 mm width×332 mm length, and the ceramic honeycomb monolithic catalyst was set to a length of 125 mm.

TABLE 3

| | Holding force of ceramic honeycomb (kgf) | | |
|---|---|---|---|
| | A | B | C |
| Initial | 150 | 115 | 150 |
| After 1st heating and oscillation | 135 | 90 | 110 |
| After 2nd heating and oscillation | 135 | 80 | 100 |
| After 3rd heating and oscillation | 135 | 80 | 90 |
| After 4th heating and oscillation | 135 | 70 | 90 |

In Table 3, lowering of the holding force by the heat resistant expansion sheet of the present invention indicated by A is extremely small, and 90% of the residual holding force was maintained after the fourth heating and oscillation. By contrast, in the heat resistant expansion sheets of the prior arts (1) and (2) represented by B and C, the residual holding force was notably lowered to 61% and 60%, respectively.

Figure 3:
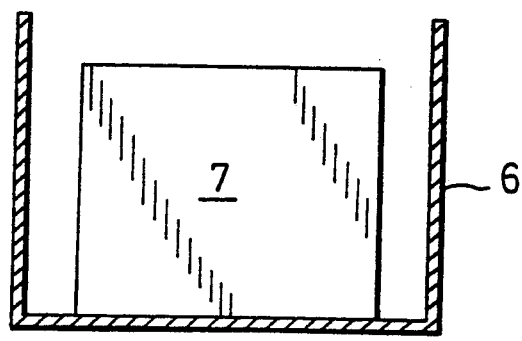
FIG. 3 is a schematic sectional view showing an oscillation method in an oscillation test of heat resistant expansion members.
Figure 4:
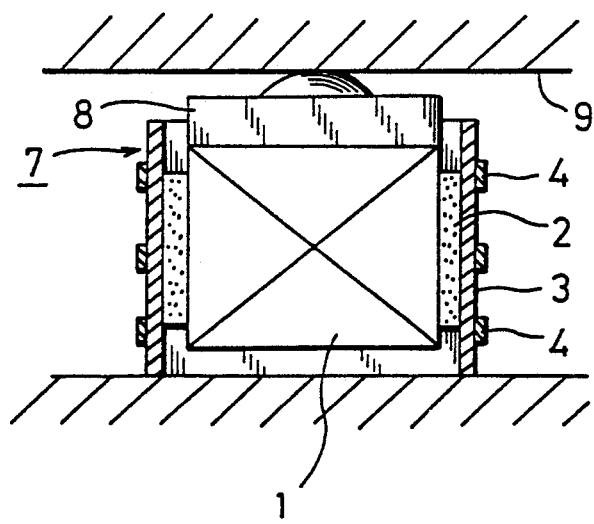
FIG. 4 is a schematic sectional view showing a measuring apparatus of holding force in the holding force test of heat resistant expansion members.

In this measurement, meanwhile, a catalyst converter 7 was placed in the metallic vibration container 6 shown in FIG. 3, and the catalyst converter was violently hit against the inner wall of the vibration container 6 at a frequency of 290 rpm and an amplitude of 20 mm according to the oscillation system, and the holding force was measured as shown in FIG. 4. That is, a load was applied to the ceramic honeycomb monolithic catalyst 1 by a hydraulic press 9 through a load cell 8, and the load was read when the ceramic honeycomb monolithic catalyst was pressed down.

In the second aspect of the present invention, the thermal expansion heat resistant expansion sheet 2 was manufactured by the beater saturation process at a blending ratio of 20 to 40 wt. % of sepiolite, 30 to 54 wt. % of treated vermiculite, 20 to 40 wt. % of ceramic fibers, 5 to 20 wt. % of organic bonding material, and 1 to 10 wt. % of E-glass fiber with a fiber diameter of 1 µm or less. The two-half metallic casing 3 and metallic band 4 are made of SUS304.

The sepiolite, in a range of 20 to 40 wt. % as stated above, prevents the negative expansion around 300° C. under surface pressure loading, and exhibits holding force enhancement of the ceramic honeycomb monolithic catalyst 1.

The treated vermiculite is obtained by treating particulate vermiculite in an aqueous solution of sodium monohydrogen carbonate, sodium monohydrogen phosphate or sodium dihydrogen phosphate. Thus, by immersing the particulate vermiculite in such an aqueous solution, Mg and Ca existing between layers of vermiculate and $Na^+$ in aqueous solution are replaced by ion exchange, which makes it difficult for the interlayer water to escape when heated. Furthermore, $Na^+$ is bonded with Na hydrate at the time of replacement, which heightens the coefficient of expansion by heating and lowers the expansion starting temperature. At less than 30 wt. %, however, the specified thermal expansion is not expected, and when exceeding 60 wt. %, it becomes light and the strength is lowered. Therefore, the blending ratio of particulate vermiculite should be properly 30 to 54 wt. %.

After immersing 50 g of unsintered South African No. 1 vermiculite in an aqueous solution of 10 g of solute dissolved in 50 cc of water for 20 hours at ordinary temperature, it was washed in running water, and was dried at 105° C.×2 hours, and the volume of vermiculite was measured by a measuring cylinder. After heating at 400° C.×30 min., the volume was measured again, and the result is shown in Table 4.

TABLE 4

| | Coefficient of expansion (%) | | | |
|---|---|---|---|---|
| Treating aqueous solution | Distilled water | Sodium mono-hydrogen-carbonate | Sodium mono-hydrogen-phosphate | Sodium di-hydrogen-phosphate |
| Coefficient of expansion (%) | −6 | 153 | 117 | 164 |

In Table 4, by treating in aqueous solutions of sodium monohydrogencarbonate, sodium monohydrogenphosphate, and sodium dihydrogenphosphate, the coefficient of volumetric expansion of over 100% was obtained.

The ceramic fibers, as mentioned above, help to prevent negative expansion around 300° C., and in particular improve the shape retaining ability by exhibiting the interlocking function in the high temperature region where the organic bonding material is lost completely.

As the organic bonding material, acrylate polymer, cellulose pulp and others may be usable, and the content must be controlled within 5 to 20 wt. because the flexibility at ordinary temperature is insufficient at less than 5 wt. %.

The E-glass fibers with a fiber diameter of 1 µm or less are, when prepared in a sheet form, form a fine reticular structure, and capture vermiculite and other fillers, and when heated after being once heated to about 600° C., E-glass fibers shrink, and act to capture vermiculite and other fillers furthermore. Accordingly, they function to prevent dropout of vermiculite and other fillers due to vibration, and further improve the shape retaining ability at ordinary temperature and strength at high temperature.

EMBODIMENT 2

It was decided to manufacture a heat resistant expansion sheet with a thickness of 4.4 mm and a density of 0.5 to 0.8 or preferably 0.7 g/cm³ by the beater saturation process at the blending ratio shown in Table 5. In this table, A denotes this embodiment, and B shows a reference example.

TABLE 5

|  | Blending ration (wt. %) | |
|---|---|---|
|  | A | B |
| E-glass of φ 1 μm or less | 4 | 0 |
| Alpha sepiolite | 21 | 22 |
| Treated vermiculite | 38 | 37 |
| Ceramic fibers | 25 | 26 |
| Organic bonding   Pulp (NBKP) | 2 | 5 |
| material             Ester acrylate | 10 | 10 |

In Table 5, instead of pulp, hemp pulp may be used, and ester acrylate may be replaced by synthetic rubber NBR1562 manufactured by Nippon Zeon.

Using sheets A and B, 15 mm wide strips were prepared, and were pulled at a speed of 200 mm/min., and the tensile strength was measured. The result is shown in Table 6. The figures are indicated by expressing the tensile strength of A at ordinary temperature as index 100.

TABLE 6

| Tensile strength index of samples after heat treatment | | |
|---|---|---|
|  | A | B |
| At ordinary temperature (without heating) | 100 | 87 |
| After heating 400° C. × 3 hr | 28 | 20 |
| After heating 600° C. × 3 hr | 19 | 13 |
| After heating 800° C. × 3 hr | 15 | 10 |

It is known from Table 6 that, when blended with E-glass with a fiber diameter of 1 μm or less, a high strength is shown in a total temperature range from ordinary temperature to high temperature.

As explained hereabove, since the heat resistant expansion member according to the first aspect of the present invention contains 20 to 40 wt. % of sepiolite, negative expansion due to creeping occurring in the low temperature region around 300° C. is reduced, and the holding force in the low temperature region is improved. At the same time, the coefficient of thermal expansion in high temperature region around 750° C. is large even in the state of high tightening surface pressure, and the holding force in the high temperature region is also increased. Therefore, the ceramic honeycomb monolithic catalyst which is brittle and inferior in toughness can be appropriately supported with a large holding force without interruption whether in the low temperature region or in the high temperature region, which makes it possible to prevent damage to the ceramic honeycomb monolithic catalyst due to loading with mechanical impact such as vibration occurring in the course of traveling of the vehicle.

Besides, the heat resistant expansion member according to the second aspect of the present invention also contains 20 to 40 wt. % of sepiolite, and therefore the negative expansion due to creeping in the low temperature region around 300° C. is decreased, and the holding force in the low temperature region is improved. At the same time, the coefficient of thermal expansion in the high temperature region around 750° C. is large even in a high tightening surface pressure state, and the holding force in the high temperature region is also increased. Still more, by containing 60 wt. % of treated vermiculite, the expansion starting temperature can be lowered from 600° C. to 400° C. That is, it has come to be possible to start expansion at the emission temperature in normal traveling of the vehicle. Furthermore, by adding E-glass with a fiber diameter of 1 μm by 1 to 10 wt. %, the strength of the expansive member and the honeycomb holding force by vibration may be further enhanced. Therefore, the ceramic honeycomb monolithic catalyst which is brittle and inferior in toughness can be appropriately supported with a large holding force without interruption whether in the low temperature region or in the high temperature region, which makes it possible to prevent damage of the ceramic honeycomb monolithic catalyst due to loading with mechanical impact such as vibration occurring during traveling of the vehicle.

What is claimed is:

1. A heat resistant expansion member comprising: 20 to 40 wt. % of sepiolite; 30 to 54 wt. % of treated vermiculite; 20 to 40 wt. % of alumina-silica fibers; 5 to 20 wt. % of organic bonding material; and 1 to 10 wt. % of E-glass with a fiber diameter of 1 μm or less, wherein treated vermiculite is obtained by treating particulate vermiculite in an aqueous solution of sodium monohydrogencarbonate, sodium monohydrogenphosphate or sodium dihydrogenphosphate.

2. A heat-resistant expansion member of claim 1, wherein sepiolite is alpha-sepiolite.

3. A heat-resistant expansion member of claim 1, wherein sepiolite is a mixture of alpha-sepiolite and beta-sepiolite.

4. A heat-resistant expansion member of claim 1, wherein the organic bonding material is at least one of acrylate polymer or cellulose pulp.

5. A heat-resistant expansion member of claim 1, composed of the blending ratio of 21 wt. % of alpha-sepiolite, 38 wt. % of treated vermiculite having particulate vermiculite treated in an aqueous solution of sodium monohydrogencarbonate, sodium monohydrogenphosphate or sodium dihydrogenphosphate, 25 wt. % of ceramic fibers, an organic bonding material comprising 2 wt. % of pulp and 10 wt. % of ester acrylate, and 4 wt. % of E-glass with fiber diameter of 1 μm or less.

6. A heat-resistant expansion member of claim 1, composed of the blending ratio of 21 wt. % of alpha-sepiolite, 38 wt. % of treated vermiculite having particulate vermiculite treated in an aqueous solution of sodium monohydrogencarbonate, sodium monohydrogenphosphate or sodium dihydrogenphosphate, 25 wt. % of ceramic fibers, an organic bonding material comprising 2 wt. % of pulp and 10 wt. % of synthetic rubber, and 4 wt. % of E-glass with fiber diameter of 1 μm or less.

7. A heat-resistant expansion member of claim 5, manufactured by the beater saturation process, with a density of 0.5 to 0.8 g/cm³.

8. A heat-resistant expansion member of claim 6, manufactured by the beater saturation process, with a density of 0.5 to 0.8 g/cm³.

* * * * *